Feb. 25, 1930.   F. J. SPANG   1,748,250
MOLDING DEVICE
Filed Aug. 18, 1924
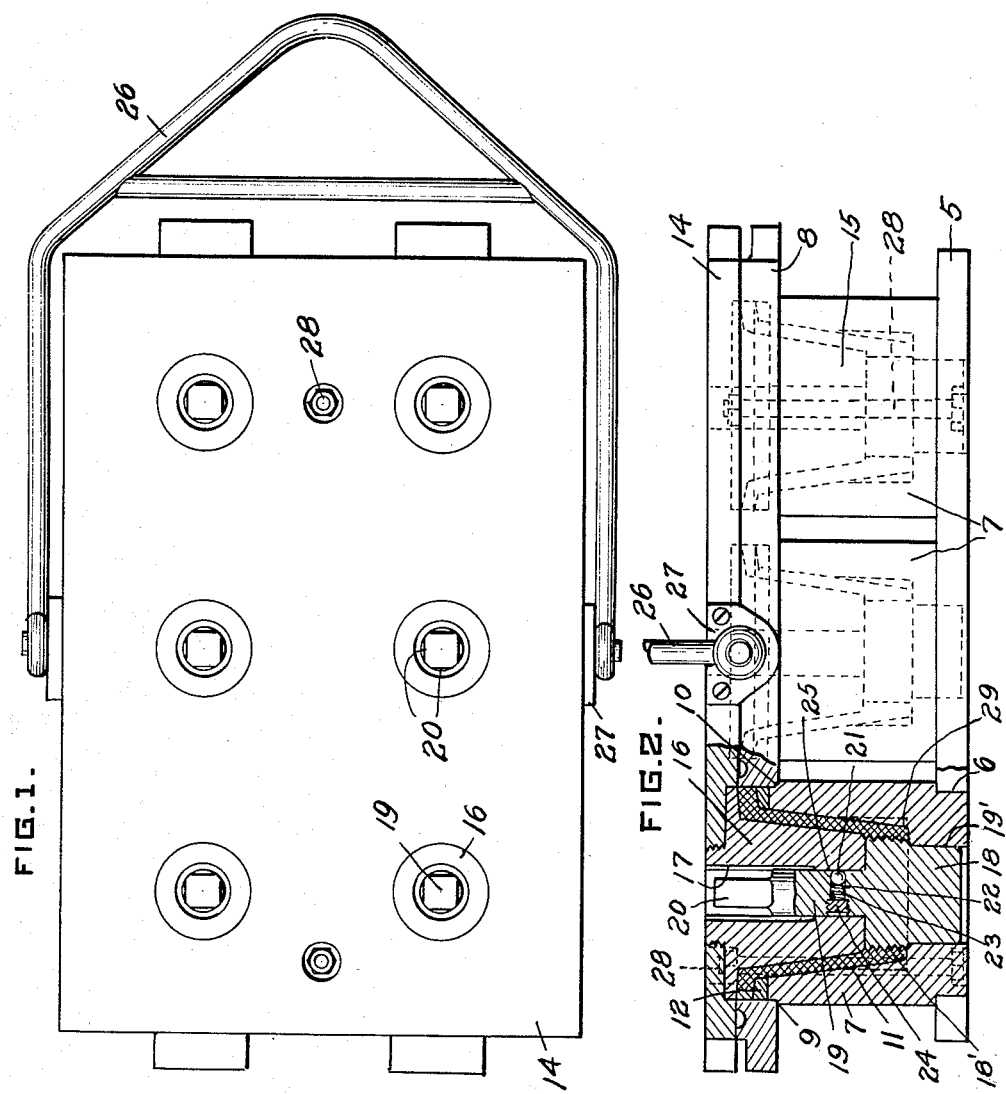
WITNESS
J. Herbert Bradley.
INVENTOR
Ferdinand J. Spang
By Greer and McCallister
His Attorneys Patented Feb. 25, 1930

1,748,250

UNITED STATES PATENT OFFICE

FERDINAND J. SPANG, OF BUTLER, PENNSYLVANIA

MOLDING DEVICE

Application filed August 18, 1924. Serial No. 732,823.

This invention relates to molding devices and more particularly to vulcanizing molds such as are used in the manufacture of articles from raw or unvulcanized rubber or rubber composition.

An object of the present invention is to provide a molding device of the type set forth having an assembly of individual molds for simultaneously forming a plurality of articles.

A further object is to provide a molding device of the type set forth in which molding cores cooperate with the mold cavities to form reentrant projections, such as internal screw threads, and are so formed as to be easily removable therefrom and also to enable the easy removal of the finished article from the mold cavity, after the molding operation.

A still further object is to provide a molding device which is easy to operate and simple and cheap to manufacture, and maintain.

These and other objects which will be apparent to those skilled in this particular art are attained by means of this invention, one embodiment of which is shown in the accompanying drawings, in which Figure 1 is a top plan view of a molding device constructed in accordance with this invention and Fig. 2 is a side elevation thereof partly in vertical section on a line passing through the center of one of the molds.

The particular embodiment of this invention which has been chosen for illustration includes a base plate on which are mounted a plurality of individual molds. A removable top plate has secured thereto a plurality of molding cores for cooperation with the mold cavities in the manufacture of the individual articles. An intermediate plate surrounds and is supported by the individual molds so as to form a rugged structure. During the molding or vulcanizing operation the top plate is rigidly secured in position by through-bolts extending upwardly from the base plate. The molds are heated by circulating steam around the individual molds from any desired source (not shown), as is well known in this particular art.

The illustrated embodiment of this invention includes a base plate 5 provided with a plurality of perforations 6 which receive the bottoms of the individual molds 7. An intermediate plate 8 is provided with perforations 9 which receive the tops of the individual molds. This plate accurately positions the molds and maintains them in properly spaced relation for cooperation with the molding cores. It rests on shoulders 10, formed around the tops of each of the molds 7 so as to securely hold the latter against either lateral or vertical displacement. The walls of the perforations 9 in the intermediate plate 8 extend upwardly above the tops of the mold cavities 11 and form in effect continuations of the mold cavities. I preferably employ removable spacers for determining the thickness of a flange which may be molded on the article if desired. The spacers are shown as name-plates 12, which, as illustrated are placed within the perforations 9 and on the tops of the molds 7 for the purpose of molding any desired legend on the article formed.

A top plate 14 is adapted to rest on and be supported by the intermediate plate 8 during the molding and vulcanizing operation. It is adapted to support a plurality of molding cores 15 which cooperate with the mold cavities to form the desired article. In order to provide a simple means for disengaging the cores from the finished article, particularly when internal reentrant projections, such as screw threads are formed thereon, each molding core is formed of two separable parts which, in the embodiment shown, frictionally engage each other. The upper part 16 is formed by an annular member of suitable shape which is threaded into the top plate 12 and provided with an axial bore 17 extending longitudinally therethrough from top to bottom. The bottom part 18 of the core, which is provided with a thread molding section 18', has an upwardly extending projection 19 which fits snugly within the bore 17 of the upper part 16 and a lower extension 19' which fits snugly within an opening in the bottom of the mold 7. The upper end of the projection 19 is formed with polygonal gripping or wrench faces 20 for a purpose to be hereinafter described.

The projection 19 is also provided with a device for frictionally engaging the wall of the perforation 17 and for varying the degree of friction between the two parts of the core. This device includes a ball 21 received within a bore 22 extending diametrically across the projection 19. A spring 23 is interposed between the ball on one side and a plug 24 which is threaded into the bore 22 on the other side. The pressure of the ball upon the wall of the bore 17 can be varied by threading the plug into or out of the diametrical bore 22. A circular fin 25 is struck up from the wall of the bore 22 so as to prevent the ball from being forced entirely out of the bore when the two parts of the molding core are separated.

The top plate 14 can be lowered into position and removed therefrom by means of a handle 26 which is pivoted to brackets 27 secured on each side of the top plate 14. During the molding and vulcanizing operation the top plate is rigidly secured in position with the molding cores in cooperative relation with the mold cavities by means of through-bolts 28 which extend upwardly between the individual mold cavities from the bottom plate 5.

The drawing illustrates a molding device adapted to be used for making rubber thread protectors, such as described and claimed in my copending application, Serial No. 732,824, filed August 18, 1924, but obviously the invention is applicable to the manufacture of any desired article.

In operation the raw or unvulcanized rubber or rubber composition is first placed around the molding cores 15, the two parts of which are frictionally secured together. The top plate is then secured in position with a molding core in each mold cavity 11. The assembled device is then placed in a steam chamber for the vulcanizing operation or, if desired, a box or casing having steam inlet and outlet openings and engaging with the intermediate and base plates to form a closed chamber may be used for passing the heating steam around the molds. When the vulcanizing is complete the top plate is released and removed from the device. In lifting the top plate the upper part 16 of each molding core which is secured to the top plate is also removed from the cooperating mold and is incidentally withdrawn from the molded article. The lower part 18 of each core remains in the mold cavity due to the fact that the adherence of the vulcanized article and the friction between the lower projection 19' and the base plate is sufficient to overcome the friction between the two parts of each core. In order to remove the lower part of the molding core use is made of the wrench surfaces 20 for rotating the same sufficiently to break the adherence of the article to the surface of the part 18 but not enough to disengage the threads of the molded article from the threads of the core. The core is then lifted from the mold, carrying with it the finished article which is then completely unthreaded from the part 18 of the molding core. The latter is again mounted on the upper part 16 and the device is again ready for use.

While I have described a specific form of apparatus I do not wish to be limited to the various details thereof but what I claim as new and desire to secure by Letters Patent is:

1. The combination in molding device, of a base plate, a plurality of molds mounted thereon, a top plate having a plurality of molding cores secured thereto and adapted to cooperate with said molds, each of said cores including separable parts secured together and means for lifting said top plate so as to remove a part of each core from the associated mold.

2. The combination in a molding device of a base plate, a plurality of molds mounted thereon, a top plate having a plurality of molding cores secured thereto and adapted to cooperate with said molds, each of said cores including separable parts frictionally secured together.

3. The combination in a molding device of a base plate, a plurality of molds mounted thereon, a top plate having a plurality of molding cores secured thereto and adapted to cooperate with said molds, each of said cores including separable parts which are frictionally secured together and means for lifting said top plate so as to remove a part of each core from the associated mold.

4. The combination in a molding device of a base plate, a plurality of molds mounted thereon, a top plate having a plurality of molding cores secured thereto and adapted to cooperate with said molds, each of said cores including separable parts which are frictionally secured together, means for lifting said top plate so as to remove a part of each core from the mold and means for rotating the other of said parts prior to its removal from the mold cavity.

5. The combination in a molding device of a base plate, a plurality of molds mounted thereon, a top plate having a plurality of molding cores secured thereto and adapted to cooperate with said molds each of said cores including separable parts which are frictionally secured together, means for lifting said top plate so as to remove a part of each core from the mold and a gripping surface on the other of said parts.

6. The combination in a molding device of a base plate, a plurality of molds mounted thereon, a top plate having a plurality of molding cores secured thereto and adapted to cooperate with said molds, each of said cores including two separable parts, means on one of said parts for frictionally engaging the other of said parts, and means for lifting said top plate so as to remove a part of each core from the associated mold and a gripping surface on the other of said parts.

7. The combination in a molding device of a base plate, a plurality of molds mounted thereon, a top plate having a plurality of molding cores secured thereto and adapted to cooperate with said molds, each of said cores including two separable parts, means on one part of said core for frictionally and yieldingly engaging the other of said parts, means for varying the degree of pressure of said first named means and means for lifting said top plate so as to remove one of said parts from the mold.

8. The combination in a molding device of a perforated base plate, a plurality of molds seated in the perforations of said plate and a top plate having a plurality of molding cores secured thereto and adapted to cooperate with said molds, each of said cores including separable parts.

9. The combination in a molding device of a base plate, a plurality of molds mounted thereon, and having shoulders formed adjacent the tops thereof, an intermediate plate supported on said shoulders and a top plate having a plurality of molding cores secured thereto and adapted to cooperate with said molds.

10. The combination in a molding device of a base plate, a plurality of molds mounted thereon, and having shoulders formed adjacent the tops thereof, an intermediate plate supported on said shoulders and provided with perforations surrounding the tops of said molds and extending thereabove, removable spacers within said perforations, forming a part of each mold cavity and a top plate having a plurality of molding cores secured thereto and adapted to cooperate with said molds.

11. The combination in a molding device of a base plate, a plurality of molds mounted thereon and open from end to end and a removable top plate having a plurality of molding cores secured thereto for cooperation with said molds, each of said cores including separable parts adapted to close the ends of the associated mold.

12. The combination in a mold, of a core formed of separable parts, one of said parts having a bore and a projection on the other of said parts receivable in said bore and provided with means engaging the wall of said bore for normally securing said parts together.

13. The combination in a mold, of a core formed of separable parts, one of said parts having a bore and a projection on the other of said parts receivable in said bore and a spring for providing a frictional engagement between said bore and said projection so as to normally secure said parts together.

14. A mold core for use in the molding of threaded articles having one part formed so as to mold a threaded surface, a separable part formed so as to mold a smooth surface and means for frictionally securing said parts together.

15. The combination in a molding device of a perforated base plate, a plurality of molds open from end to end mounted on said base plate, annular shoulders on said molds at the top thereof, a perforated plate supported on said shoulders, removable spacers within said perforations resting on the top of said molds, a top plate, a plurality of separable cores secured to said top plate and adapted to cooperate with said molds, each of said cores comprising a bottom section for closing the end of said mold, an upwardly extending projection on said bottom section, a top section secured to said top plate having a central bore therethrough for receiving the projection on said bottom section, means on said projection for yieldingly engaging said top section, means for lifting said top plate so as to remove the top section of said core from the mold and means for removing the bottom section from said molded article.

In testimony whereof, I have hereunto subscribed my name this 12th day of August, 1924.

FERDINAND J. SPANG.